(12) United States Patent
Bläsche

(10) Patent No.: US 8,442,672 B2
(45) Date of Patent: May 14, 2013

(54) METHOD AND APPARATUS FOR MONITORING THE TRANSPORT OF AN OBJECT

(75) Inventor: Dietrich Bläsche, Singen (DE)

(73) Assignee: Siemens Aktiengesellschaft, Munich (DE)

( * ) Notice: Subject to any disclaimer, the term of this patent is extended or adjusted under 35 U.S.C. 154(b) by 744 days.

(21) Appl. No.: 12/670,472

(22) PCT Filed: Jul. 16, 2008

(86) PCT No.: PCT/EP2008/059330
§ 371 (c)(1),
(2), (4) Date: Feb. 22, 2010

(87) PCT Pub. No.: WO2009/013209
PCT Pub. Date: Jan. 29, 2009

(65) Prior Publication Data
US 2010/0211214 A1    Aug. 19, 2010

(30) Foreign Application Priority Data

Jul. 25, 2007   (DE) .................. 10 2007 034 661
Feb. 13, 2008   (DE) .................. 10 2008 008 967

(51) Int. Cl.
*G06F 7/00* (2006.01)
(52) U.S. Cl.
USPC ........................................................ 700/224
(58) Field of Classification Search .......... 700/224, 700/223; 209/584
See application file for complete search history.

(56) References Cited

U.S. PATENT DOCUMENTS

| | | | |
|---|---|---|---|
| 4,949,381 A | | 8/1990 | Pastor |
| 2003/0014375 A1 | | 1/2003 | Hoffmann et al. |
| 2003/0050874 A1 | | 3/2003 | Sesek et al. |
| 2004/0249652 A1 | | 12/2004 | Aldstadt |
| 2009/0026117 A1 | * | 1/2009 | Paetsch et al. ........... 209/584 |
| 2009/0026118 A1 | * | 1/2009 | Kechel ........... 209/584 |
| 2009/0074558 A1 | * | 3/2009 | Berger et al. ........... 414/806 |
| 2009/0285486 A1 | | 11/2009 | Berger et al. |

FOREIGN PATENT DOCUMENTS

| | | |
|---|---|---|
| DE | 19644249 C1 | 4/1998 |
| DE | 102005040662 A1 | 3/2007 |
| DE | 102005040689 A1 | 3/2007 |
| EP | 0360225 B1 | 10/1995 |
| EP | 0844029 A2 | 5/1998 |
| WO | 2007022880 A1 | 3/2007 |

OTHER PUBLICATIONS

German Office Action dated Dec. 13, 2007.
Palmer: "The Bar Code Book Reading, Printing, and Specification of Bar Code Symbols", Helmers Publishing, 1991, 2nd edition.

* cited by examiner

*Primary Examiner* — Ramya Burgess
(74) *Attorney, Agent, or Firm* — Laurence A. Greenberg; Werner H. Stemer; Ralph E. Locher

(57) ABSTRACT

A method and a device monitor the transport of an object, particularly of a piece of mail that is provided with a delivery point, to which the object is transported. A sorting system reads the delivery point and generates a first attribute vector differentiating the object from all other transported objects. The first attribute vector and the read delivery point are stored. At the conclusion of the transport a second attribute vector is generated for the object. The object is identified by the second attribute vector. A central computer determines from which of those objects, having run through the sorting system at a predetermined period, the information transmitted originates.

12 Claims, 1 Drawing Sheet

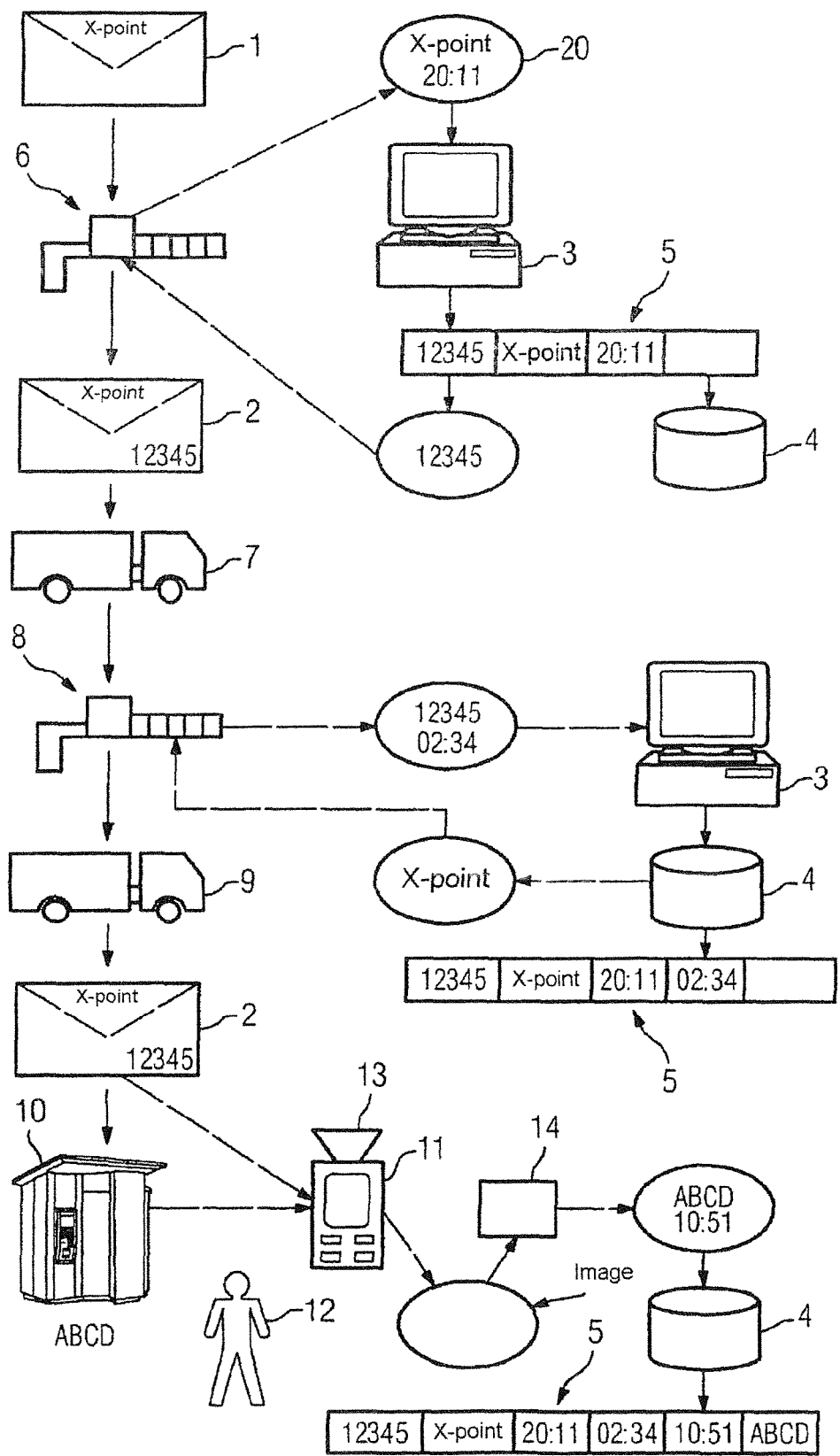

METHOD AND APPARATUS FOR MONITORING THE TRANSPORT OF AN OBJECT

BACKGROUND OF THE INVENTION

Field of the Invention

US 2003/0014375 A1 describes a method having the features of the precharacterizing clause of claim 1, and an apparatus having the features of the precharacterizing clause of claim 11. This method is used to monitor the transport of a postal item. The postal item is provided with a unique identification which, for example, is printed onto the postal item in the form of a bar code. At the top, the postal item is provided with an RFID chip in which the identification is stored in a computer-available form. The postal item is transported to a predetermined destination point. Information about the transport is recorded in a "destination distribution center", and is sent back to the "original distribution center".

US 2004/0249652 A1 describes a method and an apparatus for monitoring the transport and the delivery of objects, in particular of postal items. The object is provided with two bar codes which uniquely identify the object. While being transported, the object passes through a plurality of processing stations. The bar codes on the object are scanned in each processing station. The point in time at which the bar codes are scanned in this processing station is recorded and is transmitted together with an identification of the processing station to a central monitoring station with a database ("electronic shipping office" with "integrated data system"). The route of the object is thus tracked.

In one embodiment, the sender of the object additionally transmits transport information ("advanced ship-ping note") in electronic form to the transporter. This transport information comprises a point in time at which the object was handed over to the transporter, a desired delivery date and further specifications for transport.

US 2003/0050874 A1 proposes that the point at which an object to be transported is currently located be tracked. The object is provided with an electronic ticket, for example in the form of a bar code or an "RFID tag". By way of example, the ticket states where and to whom the object is to be transported. When the object is delivered, the ticket is read, and the actual location and point in time of delivery are stored.

DE 102005040662 A1 describes a method for identifying a postal item while it is being transported, on the basis of a feature vector, without having to provide the postal item with a unique identification. These features are classified on the basis of the measurement effort.

BRIEF SUMMARY OF THE INVENTION

The invention is based on the object of providing a method having the features of the precharacterizing clause of claim 1 and an apparatus having the features of the precharacterizing clause of claim 11, in which the object need not be provided with a unique identification.

The object is achieved by a method having the features of claim 1 and by an apparatus having the features of claim 11. Advantageous refinements are specified in the dependent claims.

The object is provided with an identification of a delivery point. By way of example, the object is in the form of a postal item, and an address is indicated on the object. The object is transported to this delivery point.

While it is being transported to the delivery point, the object passes through a sorting office at least once. It is possible for the object to pass through the same sorting office twice, or through a plurality of different sorting offices. The sorting office or the two sorting offices are linked to a central computer.

The at least one sorting office reads the delivery point identification with which the object is provided. This delivery point identification that has been read is transmitted to a central computer.

Furthermore, the at least one sorting office measures a plurality of predetermined identifying parameters. The values of these identifying parameters form a first feature vector for the object. The sorting office generates this feature vector using the parameter values. This feature vector distinguishes between the object and all the other objects which have passed through the sorting office within a predetermined time period.

The central computer stores the transmitted delivery point identification and produces a data record for the object, which comprises the transmitted delivery point identification.

Depending on the delivery point identification that is read, the sorting office initiates continuation of the transport of the object to the delivery point.

On completion of the transport, the values which the predetermined identifying parameters for the object assume are measured once again. A second feature vector is generated for the object. This second feature vector comprises these parameter values.

The point in time at which the transport of the object is completed is measured.

Information about the transport of the object is transmitted to the central computer. This information comprises
the measured point in time and
the second feature vector.

The central computer determines from which of those objects which have passed through the sorting office in the predetermined time period the transmitted information has originated. To do this, the central computer evaluates the transmitted information. In the evaluation process, the central computer compares the transmitted second feature vector with stored feature vectors. The central computer in this way finds that data record which was set up for the object once it had passed through the sorting office.

The invention saves the need to provide the object whose transport is intended to be monitored with a unique identification. In particular, this saves the step of printing a bar code on the object, or of linking the object to a data memory. In fact, the object is identified on the basis of the feature vector.

An identification with which the delivery point is provided is preferably additionally read. In one refinement, the geographic position at which the object is actually located on completion of the transport is determined, and is compared with a nominal position.

The invention will be described in the following text with reference to one exemplary embodiment. In this case, in the figures:

BRIEF DESCRIPTION OF THE SEVERAL VIEWS OF THE DRAWING

FIG. 1 shows, schematically, the method steps of the exemplary embodiment.
FIG. 2
FIG. 3
FIG. 4

DESCRIPTION OF THE INVENTION

In the exemplary embodiment, the invention is used to allow a transporter who is transporting and delivering postal items to monitor the delivery of these postal items. The transporter makes use of such monitoring in particular for the following purposes:

- The transporter wishes to verify to the sender and the recipient of the object that and when the postal item arrived at the recipient.
- The transporter wishes to check into which letterbox/P.O. Box a postman placed the postal item, and/or to whom he personally handed it over.
- He wishes to determine the positions and geographical distribution of delivery points (letterboxes/P.O. Boxes) and in this way to update a central delivery database.

The sender provides the postal item with details relating to a desired delivery point. These details preferably comprise the following information:

- an identification for the recipient of the postal item, for example the name of the recipient or their Company,
- an identification of a road and a building number, or an identification of a P.O. Box number of a location, or an identification of a package compartment installation,
- the postcode or ZIP code for this location.

The postal item therefore has to be transported to a predetermined delivery point, for example to a specific letterbox of a recipient, or to a specific P.O. Box.

It is also possible for the sender to provide the postal item with an endorsement and/or a transport specification for this postal item. An endorsement such as this defines what should be done with the postal item if it cannot be delivered to the stated recipient. A transport specification defines what transport requirements the postal item should satisfy, for example delivery on the day after posting or "first class mail".

FIG. 1 shows, schematically, the method steps for the exemplary embodiment. In FIG. 1, material flows are represented by solid lines, and data flows by dashed lines. The sender passes a postal item 1 to a transporter. This postal item 1 is intended to be transported to a delivery point 10 with the identification X-point. The identification X-point is noted as an address on the postal item 1.

While being transported from where it was posted to the delivery point 10, the postal item passes through a sorting office at least twice. First of all, it passes through that sorting office 6 which is responsible for the location where it was posted. This sorting office 6, which is referred to in the following text as the "first sorting office", reads the details "X-point" relating to the delivery point 10 or at least the location to which the postal item 1 should be transported. The first sorting office 6 first of all attempts to identify the details relating to the delivery point 10 automatically by means of OCR. If this automatic identification is unsuccessful, then an image of the surface of the postal item 1 is sent to a video coding station, and an operator visually evaluates the image, and enters the identified location.

If ambiguities occur when reading, then the first sorting office 6 sends a request to a central address database. The sorting office 6 thus determines, for example, what roads there are in a specific location, and searches for a delivery point which matches the transmitted read result and is stored in the address database.

A unique identification is generated for the postal item 1. However, this identification is not printed on the postal item. In the example in FIG. 1, the identification 12345 is generated for the postal item 1. The postal item with this identification is referred to as the postal item 2.

In the exemplary embodiment, this identification is generated automatically during the transport of the postal item. It is not necessary to generate an identification such as this when the postal item 1 is actually posted at a post office, as is nowadays the case, for example, when a postal item is intended to be sent by registered mail.

This identification is unique for a predetermined time period, that is to say this postal item 2 is distinguished from all other postal items which the transporter is transporting in that time period. The time period is several days or even a few weeks.

The first sorting office 6 is preferably linked to a central computer 3, which itself has read and write access to a central recording database 4. For each postal item, the central computer 3 in each case generates a data record and stores this in this recording database 4. By way of example, FIG. 1 shows the data record 5 for the postal item 2.

In one embodiment, the central computer 3 automatically generates the identification for the postal item 2, which is unique within the predetermined time period. Because all the sorting offices of the transporter are linked to the same central computer 3, this ensures that the generated identification is actually unique.

The generation of a data record for a postal item is initiated in one refinement by the postal item passing through a sorting office for the first time. This first sorting office 6 transmits information about the postal item 1 to the central computer 3. This transmitted information includes the identification X-point of the delivery point—or at least those details relating to the delivery point 10 which have been identified—as well as the point in time at which the first sorting office 6 identified the delivery point 10. In the example in FIG. 1, the postal item passed through the first sorting office 6 at 2011 hrs.

It is also possible for the location to which the postal item is to be transported to be a component of the identification 12345, and for the other components of the identification to distinguish between the postal item 2 and all other postal items which are to be transported to the same location in that time period. DE 19644249 C1 discloses a combination of the location and additional identification such as this. This refinement requires fewer different identifications. However, in the present exemplary embodiment, the identification is not printed on the postal item 1.

In the refinement illustrated in FIG. 1, the central computer 3 generates the identification on the basis of a request from the first sorting office 3, and transmits this identification to the first sorting office 6. In one alternative refinement, the first sorting office 6 itself generates this identification. In order to avoid two different sorting offices generating the same identification in the time period, the sorting office 6 itself adds a unique identification to the identification. For example, this is a serial number, which distinguishes the first sorting office 6 from all other sorting offices of the transporter.

The data record 5 in the recording database 4 comprises the unique identification of the postal item 2. Information about an endorsement or a transport specification which the first sorting office 6 has identified is likewise stored as part of the data record 5 in the recording database 4.

In one refinement, the first sorting office 6 prints a bar code on the postal item 2, which acts as a "delivery bar code". The following information is coded in the bar code:

- the delivery point 10 read for the postal item 2 and
- if they exist, endorsements for this postal item 2.

The refinement with the "delivery bar code" has the advantage that a data link to the central computer 3 is not absolutely essential for further transport of the postal item 2. However, this has the disadvantage that the bar code can be quite long, particularly if the bar code additionally codes an endorsement or a transport specification.

Once the first sorting office 6 has read the delivery point with which the postal item 2 is provided, the postal item 2 is transported further. It is transported to that sorting office 8 which is responsible for the determined delivery point 10. The first sorting office 6 can at the same time act as the second sorting office 8. This sorting office 8, which is referred to in the following text as the second sorting office, reads the machine-legible bar code for the delivery point on the postal item 2, and, by evaluation of the identification X-point, determines the delivery point 10 and, if appropriate, any endorsement and/or transport specification.

In one refinement, the bar code acts as a "delivery bar code". Every sorting office through which the postal item 2 passes determines the delivery address by evaluation of this bar code.

In one preferred refinement, no unique identification is applied to the postal item 2, but either a bar code in the form of a "delivery bar code" or no bar code whatsoever. The identification is simply stored as part of the data record 5 for the postal item 2 in the recording database 4. While being transported, the postal item 2 is identified with the aid of a feature vector. This feature vector comprises the values of identifying parameters on that surface of the postal item 2 to which the details relating to the delivery point 10 have been applied. Examples of these parameters are:

- details relating to the delivery point 10, for example the postcode, location, road, building number and/or P.O. Box number,
- the position and size of the block with the address,
- the height and width of the postal item 2,
- the distribution of gray tones, colors and gloss levels on the surface of the postal item 2, and/or
- the position, size and nature of the payment verification on the postal item (for example stamp, automatic stamping machine).

The parameters that are used are predetermined, to be precise in a standard form for all postal items which the transporter transports.

Every sorting office through which the postal item passes determines the values of these identifying parameters. These values, arranged in a predetermined sequence, form the identifying feature vector for the postal item.

The first sorting office 6 (that which is responsible for the postage location) for the first time determines a feature vector for the postal item. It transmits this feature vector to the central computer 3, to be precise in a suitably coded form. The central computer 3 stores this coded feature vector in the recording database 4, to be precise as part of the data record 5 for the postal item.

When the postal item 2 once again passes through a sorting office, then this second sorting office 8 likewise measures the identifying parameters and generates a feature vector. This feature vector is once again transmitted to the central computer 3. The central computer 3 compares the transmitted feature vector with all the feature vectors which are stored in the recording database 4. This results in that feature vector which is most similar to the generated feature vector being determined from the stored feature vectors. The data record 5 with which the most similar feature vector is associated provides the identified delivery point 10 and, if appropriate, any endorsement and/or transport specification—or the information that neither an endorsement nor a transport specification exists.

The second sorting office 8 preferably additionally transmits to the central computer 3 the point in time at which the postal item 2 passes through the second sorting office 8. The central computer 3 adds this second point in time to the data record 5 in the database 4 for the postal item 2. In the example shown in FIG. 1, the postal item 2 passed through the second sorting office 8 at 0234 hrs.

The second sorting office 8 initiates further transport of the postal item 2 to the delivery point 10. To do this, the second sorting office 8 uses either the result of the decoding of the "delivery bar code" or the response from the central computer to the request from the second sorting office 8, with the request comprising the "ID bar code" that was read. In the example in FIG. 1, the postal item 2 is transported by a second transport vehicle 9 to the delivery point 10. The delivery of the postal item 2 to the delivery point 10 ends the transport of the postal item 2.

A postman 12 delivers the postal item 2 to the specified recipient. For example, he places the postal item 2 in a letterbox or a P.O. Box for the recipient, or in a compartment in a package compartment installation. In the example in FIG. 1, the delivery point is a package compartment installation 10. The compartment in the installation 10 in which the postman 12 places the postal item 2 is not defined in advance, but depends on the current usage of the compartments in the package compartment installation 10.

The transport of the postal item 2 to the delivery point 10 is completed by a postman 12 carrying the postal item to the delivery point 10 and placing it there in a specified container, for example a letterbox or a P.O. Box, or passing the postal item directly to the specified recipient.

In the exemplary embodiment, the postman 12 uses a portable reader 11. The reader 11 is preferably attached to the body of the postman 12, such that it impedes his work as little as possible. By way of example, the reader 11 is attached to his belt, or he wears it in front of his chest. The postman 12 has entered a personal identification, as a result of which the reader 11 "knows" its current user.

Typically, the postman 12 takes the postal item 2 from a transport container and then places it in the specified letterbox/the predetermined P.O. Box/a package compartment in the installation 10. In the process, the postman 12 preferably passes the postal item 2 over the reader 11, once he has taken it from this transport container and before he places it in the letterbox/the P.O. Box/the package compartment installation, or hands it personally to the recipient. The postman 12 operates a button or some other operating element on the reader 11. This action initiates a reading process, which is described in the following text.

The reader 11 preferably has a camera 13 or some other image recording device. This camera 13 produces a digital image Image of the postal item 2. This digital image Image comprises an image of the delivery point identification with which the postal item 2 is provided. If the postal item 2 is provided with a bar code, then the image additionally includes an image of this bar code.

The image Image is transmitted from the reader 11 to an evaluation unit 14. The evaluation unit 14 evaluates the image Image and uses it to produce a feature vector for the postal item 2. This feature vector is compared with feature vectors in data records which are stored in the central database 4. In consequence, that data record 5 is determined which originates from the postal item 2 and which was generated for this postal item 2.

The reader 11 also measures the point in time at which the postman handed over the postal item. It generates a time stamp.

In the example shown in FIG. 1, the reader 11 recorded the identification of the postal item 2 at 1051 hrs.

The measured point in time produces a search area restriction for the search for the data record 5 for the postal item 2. The data record 5 includes the points in time at which the postal item 2 passed through the first sorting office 6 and the second sorting office 8. In the exemplary embodiment, these are the points in time 2011 hrs and 0234 hrs for the postal item 2. Points in time such as these are also stored for other postal items. The time period in which this postal item reached the delivery point 10 is in each case derived from these points in time, using transport times to be expected for each postal item. A search area restriction is preferably applied to those postal items which reach the delivery point 10 at the actually measured point in time as predicted.

A further search area restriction is preset by the delivery point 10 itself. A search is carried out for the data records for postal items which are to be transported to the delivery point 10.

In one development, the reader 11 is also equipped with a position measurement instrument, for example a receiver for the "Global Positioning System" (GPS) or a similar system. This measurement instrument measures the position at which it is located at the moment when the postman 12 operates the operating element. For example, the postman 12 operates the operating element when he and therefore the reader 11 are located in front of a letterbox installation or a package compartment installation 10, and the postman 12 inserts the postal item 2 into a compartment in the installation. The measurement instrument then measures a position which differs somewhat from the position of the installation, but is less than the largest dimension of the installation. The measurement instrument therefore de facto measures the position of the installation. This installation is generally located outside buildings, as a result of which a GPS receiver operates well.

The refinement with the position measurement instrument does not require any additional hardware modification to the delivery points. However, it is possible that the delivery point will be located inside a closed building, and that the position measurement instrument will not operate correctly in closed buildings. If a letterbox or P.O. Box which is located in a letterbox installation was chosen as the delivery point, then a position measurement can also determine only the installation, but not the delivery point within the installation. In the case of a package compartment installation 10, it is likewise possible only to determine the position of the installation, but not a single compartment.

In one alternative development, the delivery point 10 is therefore also provided with a machine-legible coding. This coding codes an identification which distinguishes the delivery point 10 from all the other delivery points within a specific region, for example a state. Each compartment in a letterbox installation or package compartment installation is provided with a specific individual identification. The reader 11 then determines this coding when the postman 12 has operated the operating element.

In the example in FIG. 1, a compartment which is then free in the installation 10 is selected on completion of the transport. This compartment in the package compartment installation 10 is provided with the identification ABCD. The reader 11 additionally determines the coding of the identification ABCD. This identification ABCD is also transmitted to the evaluation unit 14, and by it to the central computer 3.

By way of example, each delivery point is provided with a bar code which the reader 11 reads. This refinement is particularly simple, because the same bar code scanner 13 can be used which is also already used to scan a bar code on the postal item 2. However, this refinement involves the risk of manipulation: a bar code at a delivery point can relatively easily be copied or removed so that, in reality, the reader 11 scans a bar code at a different location.

Another refinement considerably reduces the risk of manipulation. In this case, each delivery point is permanently linked to a local data memory, for example an RFID chip. An identification X-point of the delivery point 10 is stored in this local data memory. The reader 11 has a component which can read the identification in this data memory.

In all the embodiments, a temporary data link is set up between the reader 11 and the evaluation unit 14. A wire-free data link may already have been set up at the moment at which the postman 12 operates the operating element of the reader 11, thus initiating the reading process. This is dependent on it being possible to set up a link with adequate bandwidth.

It is also possible for the reader 11 to store all the read results in a local data memory over a specific time period. This local data memory in the reader is protected against manipulation of the stored data for example by encryption of the data and/or by providing the data with a digital signature. The reader 11 is normally connected to the evaluation unit 14 via a stationary data interchange unit, for example by the reader 11 being connected to a stationary "docking station". The read results which have been gathered are transmitted from the reader via the "docking station" to the evaluation unit 14. By way of example, this is done on a daily basis, once the postman 12 has delivered all the postal items. After transmission, the data in the local data memory is overwritten by more recent read results.

The following read results are transmitted from the reader 11 to the evaluation unit 14:
  the digital image Image of the postal item 2,
  an identification for the reader 11 itself, and
  an identification for the postman 12 who has used the reader 11 on completion of the transport.

The evaluation unit 14 uses these details to determine which postal item 2 the postman 12 has handed over.

Furthermore, the following information is transmitted to the evaluation unit 14:
  the point in time at which the postman 12 inserted/handed over the postal item 2,
  the bar code for the delivery point 10, with which the postal item 2 is provided, and
  the location where the postman 12 did this—assuming that the location has been measured—or
  the identification X-point for the delivery point 10 where the postman 12 handed over the postal item 2—assuming that the delivery point 10 is provided with such an identification, for example by means of a mobile data memory.

In one refinement, the evaluation unit 17 reconstructs the bar code for the delivery point from the digital image Image. In another refinement, the reader 11 itself reconstructs the bar code by evaluating the stored image. It then decodes the bar code and thus determines the identification. Such readers, reconstruction methods and decoding methods are known, for example, from Roger C. Palmer: "The Bar Code Book—Reading, Printing, and Specification of Bar Code Symbols", Helmers Publ., 2nd ed., 1991.

The evaluation unit 14 preferably has read access to a data memory in which the following is stored:
  a list with identifications of delivery points, and
  a computer-available map, in which all the delivery points are entered.

The evaluation unit 14 compares the transmitted details with the map, in order to check these details, and to determine the correct delivery point in the event of ambiguities.

The evaluation unit 14 carries out statistical analyses, for example on how long a postal item requires on average, with the average transport time varying as a function of the start point and delivery point.

During this check, the evaluation unit 14 also identifies errors during transport and manipulation attempts. It compares the details relating to the delivery point 10, which the first sorting office 6 has read and has transmitted to the central computer 3, with the position and/or the identification of the delivery point 10 which the reader 11 has transmitted to the evaluation unit 14. If the discrepancy is greater than a predetermined limit, the postal item 2 has been delivered incorrectly. If the transmitted position of the delivery point 10 does not match the position of the delivery point on the map, then there may have been a manipulation attempt.

The evaluation unit 14 is connected to the central computer 3. The central computer 3 uses the feature vector which the evaluation unit 14 has calculated to determine the data record 5 for the postal item 2, and adds to this data record 5 the point in time and the location when and where this postal item 2 was actually delivered.

A data record 5 is stored in the recording database 4 containing the following information relating to the postal item 2, after completion of the transport:

the identification of the postal item ("12345" in the example in FIG. 1), an identification X-point of the predetermined delivery point (the package compartment installation 10 in the example in FIG. 1), the point in time when the postal item 1 passed through the first sorting office 6 and was provided with an identification there (2011 hrs)

the point in time when the postal item 2 with the identification passed through the second sorting office 8 (0234 hrs), the point in time when the postal item 2 was delivered (1051 hrs), the identification of the delivery point 10 where the postal item was actually delivered (in the example in FIG. 1, the compartment ABCD in the package compartment installation 10), an identification for the reader 11, and an identification for the postman 12.

The invention means that there is no need for a sender of a postal item to carry out a specific action to ensure that the transport and the delivery of the postal item 2 are monitored. In particular, there is no need—although it is invariably possible—for the sender to post the postal item to be monitored as registered post at a post office, where it is provided with a legible identification in advance. Furthermore, there is no need for the sender or a sorting office to provide the postal item with specific annotations or identifications.

The invention requires only a small amount of additional complexity. The postman 12 requires a reader 11. He frequently carries a reader 11 such as this with him in any case, for example in order to hand over registered mail. The only additional method step in addition to the normal procedure for transport is to produce the digital image Image of the postal item 2 at the moment when the postal item 2 reaches the delivery point 10. The delivery point 10 is optionally additionally identified itself.

LIST OF REFERENCE SYMBOLS

| Reference symbol | Meaning |
| --- | --- |
| 1 | Postal item with identification of the delivery point 10 before generation of the identification |
| 2 | Postal item with identification of the delivery point 10 after generation of the identification |
| 3 | Central computer |
| 4 | Central recording database |
| 5 | Data record for the postal item in the recording database 4 |
| 6 | First sorting office |
| 7 | First transport vehicle |
| 8 | Second sorting office |
| 9 | Second transport vehicle |
| 10 | Delivery point; in this case: compartment in a package compartment installation |
| 11 | Portable reader |
| 12 | Postman |
| 13 | Camera on the reader 11 |
| 14 | Evaluation unit |
| 20 | Message with the delivery point identification X-point and the point in time at which the postal item passes through the first sorting office 6 |
| 12345 | Identification of the postal item 2, component of the data record 5 |
| Image | Image of the postal item 2, recorded by the camera 13 |
| ABCD | Identification of the free compartment in the package compartment installation 10 into which the postal item 2 is inserted |
| X-point | Identification of the delivery point 10 |

The invention claimed is:

1. A method for monitoring a transport of an object, including postal items, to a delivery point, which comprises the steps of:

providing the object with a delivery point identification of the delivery point;

transporting the object through a sorting office at least once, the sorting office reads the delivery point identification and initiates a continuation of transport of the object to the delivery point;

measuring, in the sorting office, parameter values of a plurality of predetermined identifying parameters and generating a first feature vector for the object, the first feature vector containing the parameter values, the first feature vector distinguishing between the object and all other objects which have passed through the sorting office within a predetermined time period;

transmitting the delivery point identification that has been read to a central computer;

storing in the central computer the delivery point identification;

transmitting information about the transport to the central computer resulting in transmitted information;

evaluating, via the central computer, the transmitted information for determining from which of the objects which have passed through the sorting office in the predetermined time period the transmitted information originated from;

performing the following steps on completion of the transport:

measuring once again the parameter values which the predetermined identifying parameters for the object assume;

generating a second feature vector for the object, the second feature vector containing the parameter values; and measuring a point in time at which the transport of the object is completed;

providing the transmitted information with the following information about a completion of the transport: a measured point in time and the second feature vector; and determining the object via the central computer by comparing the second feature vector with stored feature vectors.

2. The method according to claim 1, which further comprises carrying out a measurement of the point in time at which the transport of the object is completed, and a measurement of the second feature vector on completion of the transport, using a portable reader.

3. The method according to claim 2, which further comprises:

producing, via the portable reader, an image of the object; and producing the second feature vector using the image.

4. The method according to claim 1, which further comprises initiating, via the sorting office, transport of the object to a further sorting office;

passing the object through at least the further sorting office in a course of the transport; and determining, via the further sorting office, the delivery point identification and initiate a continuation of the transport of the object to the delivery point, the determining of the delivery point identification by the further sorting office includes the following steps performed by the further sorting office:

measuring values of parameters of the object resulting in parameter values;

generating a third feature vector which comprises the parameter values; and transmitting the third feature vector to the central computer;

comparing, via the central computer, the third feature vector with stored feature vectors for determining the delivery point identification; and transmitting a determined delivery point identification to the further sorting office.

5. The method according to claim 1, which further comprises measuring a position at which the object is located during a point in time measurement resulting in a measured position and the information transmitted to the central computer additionally comprises a measured position.

6. The method according to claim 5, which further comprises:

creating a read access for the central computer to a computer-available map;

entering a plurality of possible delivery points on the computer-available map; and comparing, via the central computer, the measured and transmitted position with possible delivery points entered on the map.

7. The method according to claim 1, which further comprises:

transporting the object to a receiving apparatus which is located at the delivery point, which is designed to receive the object, and which is provided with a machine-legible identification;

at the point in time at which the transport of the object is completed, reading the machine-legible identification of the delivery point resulting in a read delivery point identification; and forming the transmitted information with the read delivery point identification.

8. The method according to claim 7, wherein the determination of the object by the central computer further comprises comparing, via the central computer, the transmitted delivery point identification with the read delivery point identifications.

9. The method according to claim 7, which further comprises:

creating a read access for the central computer to a computer-available map and an identification table;

entering a plurality of possible delivery points on the computer-available map;

storing the identification of each delivery point entered on the map in the identification table for each such delivery point; and comparing, via the central computer, the determined and transmitted delivery point identification with the possible delivery points entered on the map, using the identification table.

10. The method according to claim 1, wherein the object to be transported is a postal item.

11. An apparatus for monitoring a transport of an object, including a postal item, to a delivery point, the object being provided with a delivery point identification of the delivery point, the apparatus comprising:

a sorting office, the object passes through said sorting office at least once while it is being transported, said sorting office reading the delivery point identification and initiates a continuation of the transport to the delivery point;

a database;

a central computer for storing the read and transmitted delivery point identification in said database, the apparatus is designed such that information about the transport is transmitted to said central computer, and said central computer evaluates the information transmitted to determine from which of the objects which have passed through said sorting office in a predetermined time period the information transmitted has originated;

a reading and evaluation unit;

said sorting office measures parameter values of a plurality of predetermined identifying parameters, and generates a first feature vector for the object, the first feature vector containing the parameter values, the first feature vector distinguishing between the object and all other objects which have passed through said sorting office within the predetermined time period;

said reading and evaluation unit is configured, on completion of the transport, to once again measure the parameter values which the predetermined parameters for the object assume, to generate a second feature vector for the object, the second feature vector containing the parameter values, to measure a point in time at which the transport of the object is completed, and to transmit the second feature vector and the measured point in time to said central computer; and said central computer comparing the transmitted second feature vector with stored feature vectors to determine the object.

12. The apparatus according to claim 11, wherein:
said reading and evaluation unit includes a portable reader and an evaluation unit, said portable reader, on completion of the transport, produces an image of the object and transmits the image to said evaluation unit, and measures a point in time at which the transport of the object is completed, said evaluation unit uses the image to generate the second feature vector for the object and to transmit the second feature vector to said central computer.

* * * * *